United States Patent
Cisek (10) Patent No.: US 10,788,102 B2
(45) Date of Patent: Sep. 29, 2020

(54) AXLE FINAL DRIVE ASSEMBLY WITH PIVOTING GEAR SET

(71) Applicant: Deere & Company, Moline, IL (US)

(72) Inventor: Roman Cisek, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 36 days.

(21) Appl. No.: 16/202,566

(22) Filed: Nov. 28, 2018

(65) Prior Publication Data

US 2020/0166102 A1    May 28, 2020

(51) Int. Cl.
| | |
|---|---|
| *F16H 1/48* | (2006.01) |
| *B60B 35/12* | (2006.01) |
| *B62D 49/06* | (2006.01) |
| *F16D 3/18* | (2006.01) |
| *B60K 17/04* | (2006.01) |
| *B60K 17/16* | (2006.01) |
| *B62D 55/08* | (2006.01) |

(52) U.S. Cl.
CPC .............. *F16H 1/48* (2013.01); *B60B 35/125* (2013.01); *B60K 17/046* (2013.01); *B62D 49/0678* (2013.01); *F16D 3/185* (2013.01); *B60K 17/16* (2013.01); *B62D 55/08* (2013.01)

(58) Field of Classification Search
None
See application file for complete search history.

(56) References Cited

U.S. PATENT DOCUMENTS

| | | | | |
|---|---|---|---|---|
| 2,516,077 | A * | 7/1950 | Schmitter | F16H 1/22 74/410 |
| 3,165,160 | A | 1/1965 | Lee et al. | |
| 3,424,035 | A * | 1/1969 | Heidrich | F16H 57/02004 475/335 |
| 3,839,922 | A * | 10/1974 | Hiersig | F16H 1/2845 74/410 |
| 3,885,446 | A * | 5/1975 | Pengilly | F16H 3/095 74/331 |
| 4,173,906 | A * | 11/1979 | Altenbokum | F16H 1/2845 475/337 |
| 4,384,498 | A * | 5/1983 | Eichinger | F16H 1/2809 475/343 |
| 4,399,719 | A * | 8/1983 | Chszaniecki | B30B 11/241 74/410 |
| 4,471,671 | A * | 9/1984 | Sigg | B02C 15/006 475/343 |
| 4,876,908 | A * | 10/1989 | Pengilly | F16H 1/22 74/410 |

(Continued)

FOREIGN PATENT DOCUMENTS

| | | |
|---|---|---|
| DE | 2910602 A1 | 10/1980 |
| WO | 2016091502 A1 | 6/2016 |

*Primary Examiner* — Dirk Wright
(74) *Attorney, Agent, or Firm* — Klintworth & Rozenblat IP LLP (57) ABSTRACT

An axle final drive assembly for a work vehicle is provided. The axle final drive assembly includes a final drive housing; an output shaft extending from the final drive housing; a planetary gear set contained in the final drive housing and having an element fixed to the output shaft; and an input member contained in the final drive housing providing rotational input to the planetary gear set for driving the output shaft. The planetary gear set, at least in part, is pivotally coupled to the input member.

17 Claims, 6 Drawing Sheets

(56) References Cited

U.S. PATENT DOCUMENTS

| | | | |
|---|---|---|---|
| 4,885,959 A * | 12/1989 | Shinjo | F16H 1/2836 475/347 |
| 8,216,108 B2 | 7/2012 | Montestruc | |
| 8,617,024 B2 | 12/2013 | Johnson et al. | |
| 8,864,621 B2 * | 10/2014 | Phebus | F16H 1/2818 475/346 |
| 9,227,716 B2 | 1/2016 | Heer | |
| 9,797,475 B2 * | 10/2017 | Altamura | F16H 57/0479 |

* cited by examiner

AXLE FINAL DRIVE ASSEMBLY WITH PIVOTING GEAR SET

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to axle arrangements of work vehicles, and in particular, to final drive assemblies in axle arrangements of work vehicles.

BACKGROUND OF THE DISCLOSURE

Various types of work vehicles, such as tractors, include ground-engaging wheels or tracks. For agricultural tractors, particularly those configured for row crop functionality, it may be desirable to adjust the lateral spacing between left and right wheels or tracks. Typically, to adjust the wheel or track width of a tractor, the axle shafts of the axle arrangement are elongated to enable a range of positions for adjustments. However, these arrangements may be relatively complex and/or subject to reliability issues.

SUMMARY OF THE DISCLOSURE

The disclosure provides final drive assemblies in axle arrangements of work vehicles.

In one aspect, the disclosure provides an axle final drive assembly for a work vehicle. The axle final drive assembly includes a final drive housing; an output shaft extending from the final drive housing; a planetary gear set contained in the final drive housing and having an element fixed to the output shaft; and an input member contained in the final drive housing providing rotational input to the planetary gear set for driving the output shaft. The planetary gear set, at least in part, is pivotally coupled to the input member.

In another aspect, the disclosure provides a driveline for a work vehicle. The driveline includes a first drive system with a drive wheel; a first axle shaft with a first end and a second end, the first end of the first axle shaft engaging the drive wheel of the first drive system; and a first final drive assembly. The first final drive assembly includes a final drive housing receiving the second end the first axle shaft; and a planetary gear set contained in the final drive housing and having an element fixed to the first axle shaft. The driveline further includes an axle arrangement center section configured to receive rotational input from a drive shaft and comprising an input member to distribute at least a portion of the rotational input to the planetary gear set for driving the first axle shaft. The planetary gear set, at least in part, is pivotally coupled to the input member of the axle arrangement center section.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed axle final drive assembly in an axle arrangement of a track work vehicle, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension.

As used below, unless otherwise noted, the term "longitudinal" may encompass an orientation or dimension parallel to an axis extending between the front and the rear of the vehicle (e.g., fore and aft or forward and reverse). Similarly, the term "lateral" may encompass an orientation or dimension parallel to an axis extending from one side of the vehicle to the other, perpendicular to the longitudinal dimension. The term "vertical" may encompass an orientation parallel to an axis extending between the top and bottom of the vehicle, perpendicular to the longitudinal and lateral orientations. The terms "inboard" and "outboard" may refer to a relative lateral direction with respect to a central longitudinal axis of the vehicle. For example, "inboard" refers to a relative direction towards the center of the vehicle, and "outboard" refers to a relative direction away from the center of the vehicle.

As introduced above, various types of work vehicles, such as tractors, include tracks that enable improved traction and movement through rough or muddy fields. Certain track work vehicles, particularly agricultural tractors, allow an adjustment of the track width between track systems on either side of the tractor to enable operation in a variety of environments, including different row spacings and different agricultural functions. Generally, such tractors have elongated axle shafts that enable the track systems to be repositioned along the axle shafts. However, in order to maximize the possible range of track adjustment along the axle shafts, it is beneficial to minimize the axial lengths of the components of the axle arrangement, including the final drive assemblies that couple the axle shafts to the axle arrangement. Conventional axle arrangements encounter challenges with this approach and typically require additional components to facilitate operation in which axle shafts are subject to high bending forces resulting from tractor weight or drive belt pull forces, which may result in deflections along the axle arrangement.

This disclosure provides an alternative to conventional axle arrangements by providing embodiments with an axle arrangement with one or more final drive assemblies that accommodate deflections within the relatively small axial length of the final drive assembly in order to maximize the available axle length for track adjustment. The final drive assembly includes a planetary gear set with an element, such as a sun gear, that forms a pivoting arrangement with an input member. This pivoting engagement accommodates or "absorbs" deflections within the final drive assembly. As used herein, the term "pivot" refers to an intentional, designed, and/or controlled movement of an element about a point or axis, e.g., such that a longitudinal axis of an element repositioned to be offset from a nominal longitudinal axis to at least temporarily result in misalignment. The pivoting may be a result of a bending force or independent of a bending force. This intentional pivoting accommodates the misalignment in the respective element to mitigate or prevent the forces that cause the pivoting movement from being transferred to adjacent or cooperating elements. Other mechanisms may also accommodate deflections, including spherically crowned teeth on planet gears and spherical or crowned bearings within the final drive assembly.

Despite the relatively small size, the final drive assembly provides the commanded power in a robust and reliable manner by accommodating and/or mitigating any bending forces and resulting deflections imparted onto the final drive assembly by the axle shaft, thereby improving reliability, cost, performance, and customer satisfaction associated with operating the work vehicle.

Figure 1:
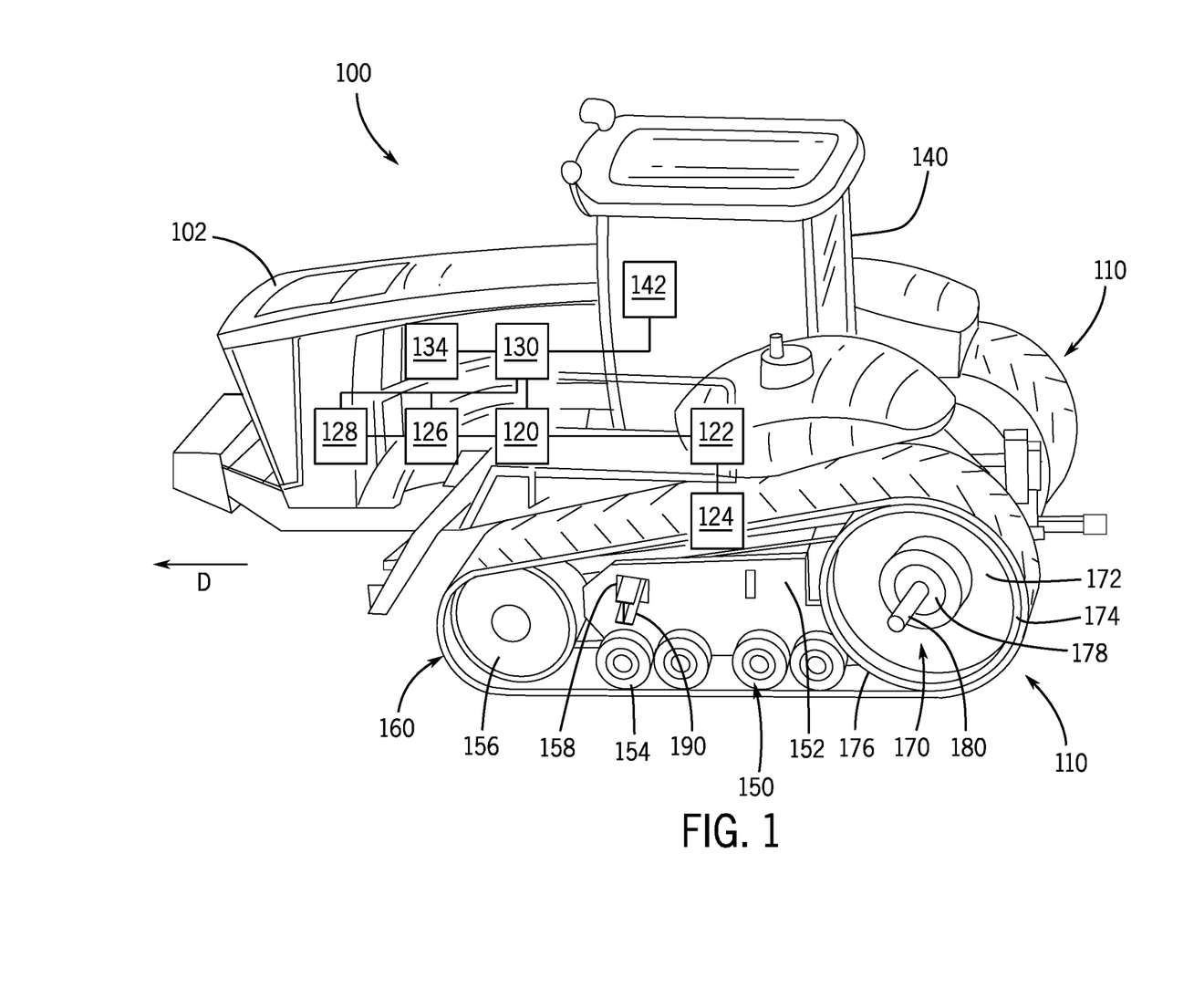
FIG. 1 is a left front perspective view of an example work vehicle in the form of a track agricultural tractor in which the disclosed axle final drive assembly may be used according to an embodiment.
Figure 2:
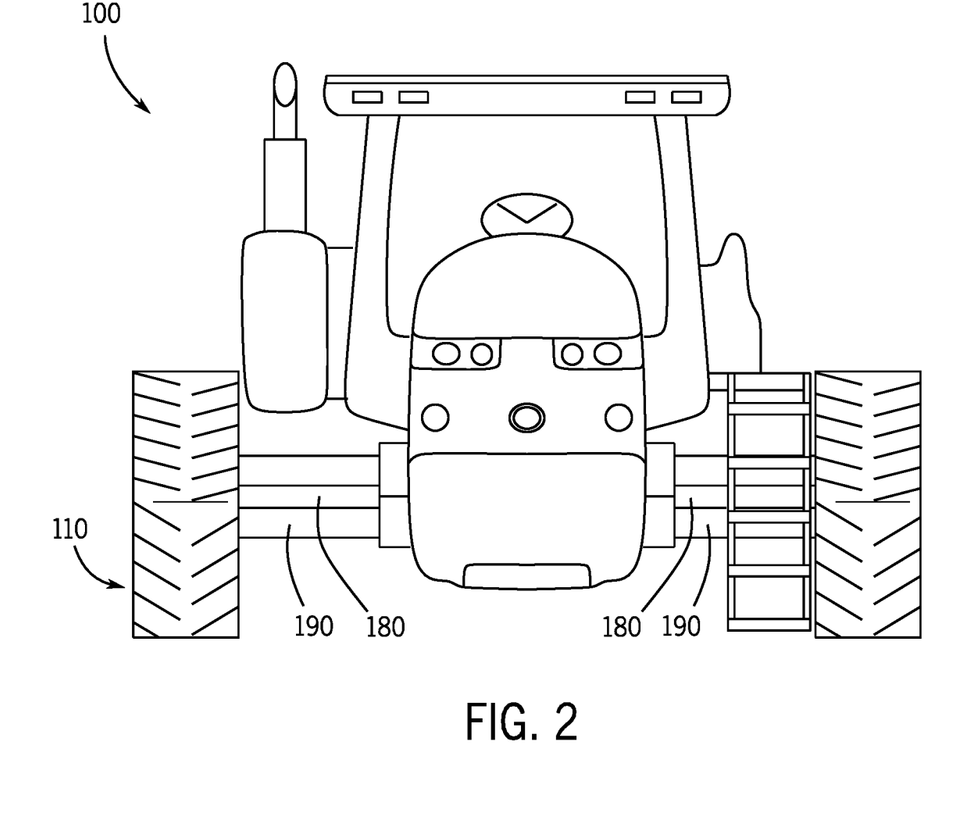
FIG. 2 is a front view of the tractor of FIG. 1.

The following describes an example final drive assembly for a work vehicle. The final drive assembly may be utilized with various machines or work vehicles, including tractors and other machines for in the agricultural and construction industries. Referring to FIGS. 1 and 2, in some embodiments, a final drive assembly may be used with a tractor 100. It will be understood that the implementation within the tractor 100 is presented as an example only. Other work vehicles, such as those used in the construction industry, may benefit from the disclosed final drive assembly as well. Moreover, other agricultural vehicles, such as wheeled tractors and other types of work vehicles, may benefit from the final drive assembly discussed in greater detail below.

Referring to FIGS. 1 and 2, the tractor 100 is shown as a track work vehicle. The tractor 100 includes a pair of end drive systems, such as track systems 110, and a source of propulsion, such as an engine 120, coupled to a frame 102. The engine 120 supplies power to a transmission 122. The transmission 122 transfers the power from the engine 120 to a suitable driveline 124 coupled to one or more of the track systems 110 to enable the tractor 100 to move. As described in greater detail below, the driveline 124 may include one or more axle arrangements with one or more final drive assemblies that facilitate the transfer to power between the engine 120 and the track systems 110. Although discussed below with reference to track systems 110, the axle arrangements and/or final drive assemblies described herein may also be used with wheel configurations.

As illustrated in FIG. 1, the tractor 100 includes a pair of the track systems 110 associated with a first or rear axle assembly (not shown in FIG. 1) relative to a forward driving direction D. The track systems 110 are mounted on respective axle shafts 180. It should be noted that while the tractor 100 is illustrated herein as having a single pair of track systems 110, it will be understood that the tractor 100 can include any number of track systems 110, including additional pairs. As described below, the track systems 110 are associated with an axle arrangement that forms part of the driveline 124 to receive input torque from a main drive shaft (not shown) and to distribute the power to left- and right-side axles shafts 180 on which the track systems 110 are mounted. In this example, the left side track system 110 is more clearly depicted in FIG. 1 and will be described. However, it is noted that the right-side track system 110 is substantially identical to the left side track system 110. Additional details about the track systems 110 are provided below.

In one example, the engine 120 is an internal combustion engine, such as a diesel engine, that is controlled by an engine control module. It should be noted that the use of an internal combustion engine is merely exemplary, as the propulsion device can be a fuel cell, electric motor, a hybrid-electric motor, etc.

The tractor 100 also includes one or more pumps 126 that may be driven by the engine 120 of the tractor 100. Flow from the pumps 126 may be routed through various control valves 128 and various conduits (e.g., flexible hoses and lines) to control various components associated with the tractor 100. Flow from the pumps 126 may also power various other components of the tractor 100. The flow from the pumps 126 may be controlled in various ways (e.g., through control of the various control valves 128 and/or a controller 130 associated with the tractor 100).

Generally, the controller 130 (or multiple controllers) may be provided, for control of various aspects of the operation of the tractor 100, in general. The controller 130 (or others) may be configured as a computing device with associated processor devices and memory architectures, as a hard-wired computing circuit (or circuits), as a programmable circuit, as a hydraulic, electrical or electro-hydraulic controller, or otherwise. As such, the controller 130 may be configured to execute various computational and control functionality with respect to the tractor 100 (or other machinery). In some embodiments, the controller 130 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 130 (or a portion thereof) may be configured as an assembly of hydraulic components (e.g., valves, flow lines, pistons and cylinders, and so on), such that control of various devices (e.g., pumps or motors) may be implemented with, and based upon, hydraulic, mechanical, or other signals and movements.

The controller 130 may be in electronic, hydraulic, mechanical, or other communication with various other systems or devices of the tractor 100 (or other machinery, such as an implement coupled to the tractor 100). For example, the controller 130 may be in electronic or hydraulic communication with various actuators, sensors, and other devices within (or outside of) the tractor 100, including various devices associated with the pumps 126, control valves 128, and so on. The controller 130 may communicate with other systems or devices (including other controllers, such as a controller associated with an implement) in various known ways, including via a CAN bus (not shown) of the tractor 100, via wireless or hydraulic communication means, or otherwise.

Various sensors 134 may also be provided to observe various conditions associated with the tractor 100. In some embodiments, various sensors 134 (e.g., pressure, flow or other sensors) may be disposed near the pumps 126 and control valves 128, or elsewhere on the tractor 100. For example, sensors 134 observe a pressure associated with the pumps 126 and generate sensor signals based thereon.

The tractor 100 also includes a cab 140, which includes a human-machine interface 142. The controller 130 receives input commands and interfaces with the operator via the human-machine interface 142. The human-machine interface 142 may be configured in a variety of ways. In some embodiments, the human-machine interface 142 may include one or more joysticks, steering wheels, various switches or levers, one or more buttons, a touchscreen interface that may be overlaid on a display, a keyboard, a speaker, a microphone associated with a speech recognition system, or various other human-machine interface devices. Among other functions, the human-machine interface 142 may be utilized to operate the engine 120 and driveline 124 of the tractor 100 for propelling and maneuvering the tractor 100 via the track systems 110.

Generally, each of the track systems 110 includes an undercarriage assembly 150, a track 160, and a drive wheel 170. In one example, the drive wheel 170 is annular with a drive wheel hub 172 that defines an outer perimeter 174. The drive wheel hub 172 couples the drive wheel 170 to an axle housing (not shown). The drive wheel hub 172 further includes one or more clamps or fasteners 178 for engagement between the drive wheel 170 and the axle shaft 180 such that rotation of axle shaft 180 drives the drive wheel 170, and thus, the track system 110.

The outer circumference of the drive wheel 170 defines a number of track guides 176 that extend about the perimeter 174. The track guides 176 operate to engage teeth on the interior side of the track 160 to transfer torque from the drive wheel 170 to the track 160. The drive wheel 170 may be formed by a metal or metal alloy and cast as one integral piece. It will be understood, however, that the drive wheel 170 can be formed by multiple pieces that are welded or otherwise fastened together.

The undercarriage assembly 150 includes a frame 152 that supports various aspects of the track system 110. In one embodiment, the undercarriage assembly 150 includes a first idler wheels 154 and a plurality of bogey or second idler wheels 156, which are each supported for rotation relative to the undercarriage frame 152. The first and second idler wheels 154, 156 cooperate to guide the track 160 along the ground as it is driven by the drive wheel 170. It should be noted that this configuration of drive wheels 170 and/or idler wheels 154, 156 is merely an example and other drive system arrangements may be employed.

The undercarriage frame 152 further defines a slot or aperture 158 that receives a support (or walking) beam 190 that extends from the vehicle frame 102 or a portion of the driveline 124. One or more fasteners and corresponding slots or other mechanisms (not shown) may be provided on the frame 152 and/or support beam 190 to secure the position of the undercarriage frame 152 along the support beam 190. The support beam 190 and the drive axle shaft 180 function to support the track systems 110 on the tractor 100, as discussed in greater detail below.

The track 160 is continuous and is received about the perimeter 174 of the drive wheel 170 and the undercarriage assembly 150. In this example, the track 160 is formed by a polymeric material; however, the track 160 can be composed of a metal or metal alloy. An exterior surface of the track 160 includes a plurality of projections or treads that project from the exterior surface to engage the terrain over which the tractor 100 travels. As introduced above, the interior surface includes the plurality of teeth (not shown) that extend from the interior surface to engage the drive wheel 170 and the idler wheels 154, 156 to move or drive the track 160 about the perimeter 174 of the drive wheel 170 and the undercarriage assembly 150.

Although not shown in detail, the track systems 110 may include any number of additional components for facilitating the engagement of the track system 110 with the ground and/or for transferring torque between the axle shaft 180 and the drive wheel 170. Such components may include suspension arrangements, gearing arrangements, pivoting arrangements, braking arrangements, tensioning arrangements, and the like.

As introduced above, the track systems 110 and associated components of the axle arrangement are configured such that the track systems 110 are adjustable in the lateral dimension along the respective support beams 190 and drive axle shafts 180. For example, to adjust the track width, any fasteners on the support beam 190 may be loosened or removed. Further, clamps 178 on the drive wheel hub 172 of the drive wheel 170 may be loosened or removed. Subsequently, a lift mechanism (e.g., a forklift vehicle) may engage the undercarriage frame 152 to lift the drive system 110 slightly off of ground and laterally reposition the drive system 110 such that the tractor 100 has the desired track width. Upon removal of the lift mechanisms, the fasteners on the support beam 190 and the clamps 178 on the drive wheel hub 172 are secured and the steps are repeated for the other drive system 110 to complete the adjustment process. In the example depicted in FIG. 1, the tractor 100 has a relatively narrow track width; and in the example depicted in FIG. 2, the tractor 100 has be modified such that the track width is relatively wide. In certain embodiments, the track width is adjustable from about 72 inches to about 120 inches, and to various positions between 72 inches and 120 inches.

As will be discussed, in certain embodiments, the driveline 124 includes an axle arrangement with final drive assemblies that facilitate track adjustability. In particular, each final drive assembly has a relatively small axial length that enables a greater range of adjustability. Despite the relatively small axial length, the final drive assemblies are configured to robustly deliver relatively high amounts of torque.

Figure 3:
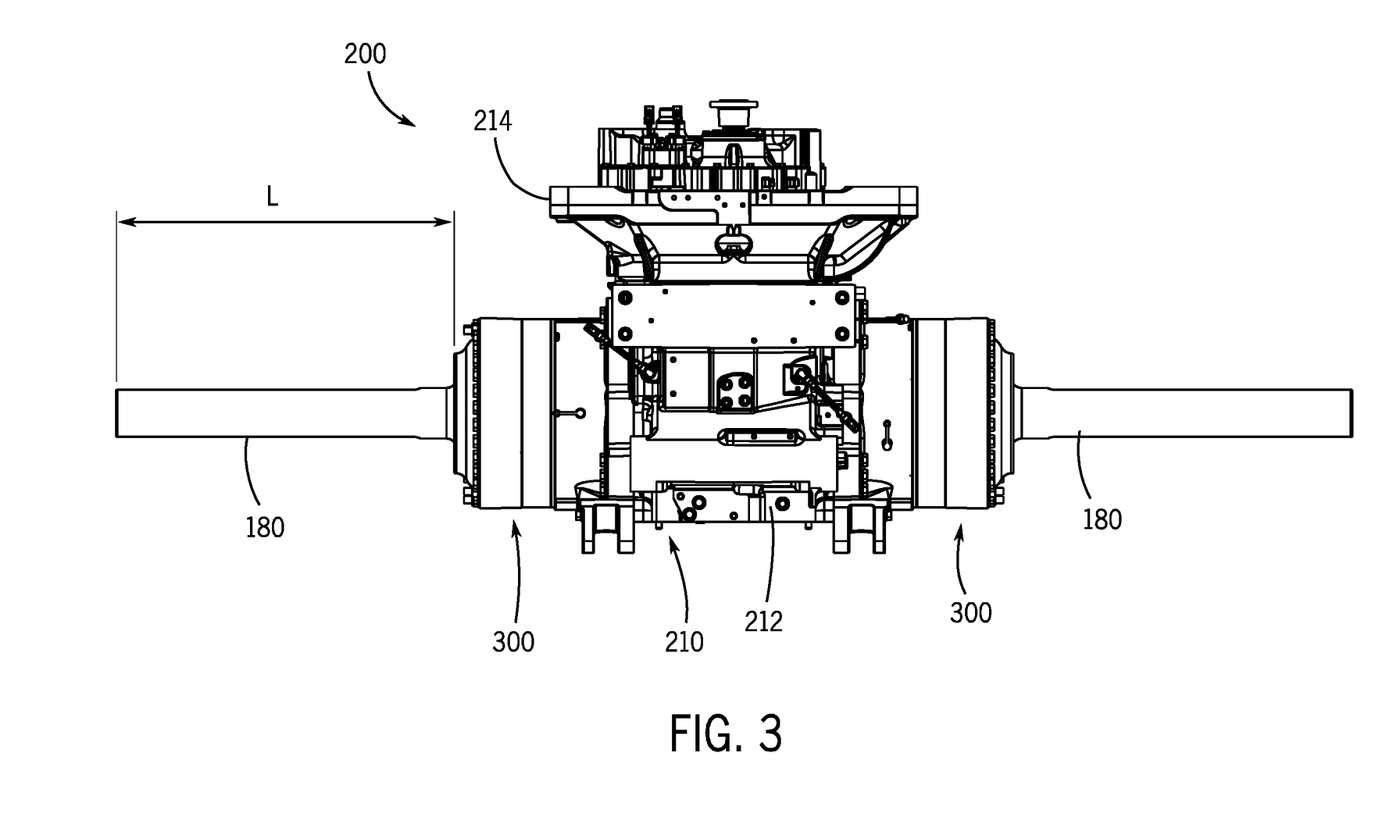
FIG. 3 is a front perspective view of an axle arrangement that may be incorporated into the tractor of FIG. 1 according to an embodiment.

FIG. 3 is a front perspective view of an axle arrangement 200 that may be incorporated into the tractor 100 of FIG. 1 according to an embodiment. As described above with reference to FIG. 1, the axle arrangement 200 may form part of the driveline 124 that transfers power from the engine 120 to the track systems 110. Although not shown in FIG. 3, the axle arrangement 200 may receive a main input member coupled to the engine 120, such as a drive shaft. During operation, the axle arrangement 200 functions to distribute power from the drive shaft to the axle shafts 180 that extend from each side of the axle arrangement 200.

The axle arrangement 200 may be formed by an axle center section (or differential) 210 and at least one final drive assembly 300. In the depicted example, the final drive assemblies 300 are positioned on either side of the axle center section 210 to support the respective axle shafts 180.

The axle center section 210 includes a center section housing 212 that houses the various components, some of which are discussed in greater detail below. A mounting structure 214 is also provided to mount the center section housing 212 to the frame of the tractor 100. As introduced above, the axle center section 210 is generally configured to receive the input power from an input member and to distribute the power to the final drive assemblies 300, which in turn, transfer the power to the axle shafts 180.

As shown, the axle shafts 180 extend out of the final drive assemblies 300 along a designated length L. As introduced above, the track systems 110 (FIG. 1) may be adjustable along the lengths L of the axle shafts 180, thereby providing varying track widths for the tractors 100. The variance of the track widths is increased by the relatively small axial lengths of the final drive assemblies 300. In some instances, axle shafts 180 may be subject to bending loads resulting from the track systems 110 and/or the weight of the tractor 100, particularly when the track systems 110 are located at relatively wide distances, away from the center of the axle arrangement 200. As described in greater detail below, these bending loads may potentially result in deflections that are accommodated within the relatively small axial lengths of the final drive assemblies 300.

Figure 4:
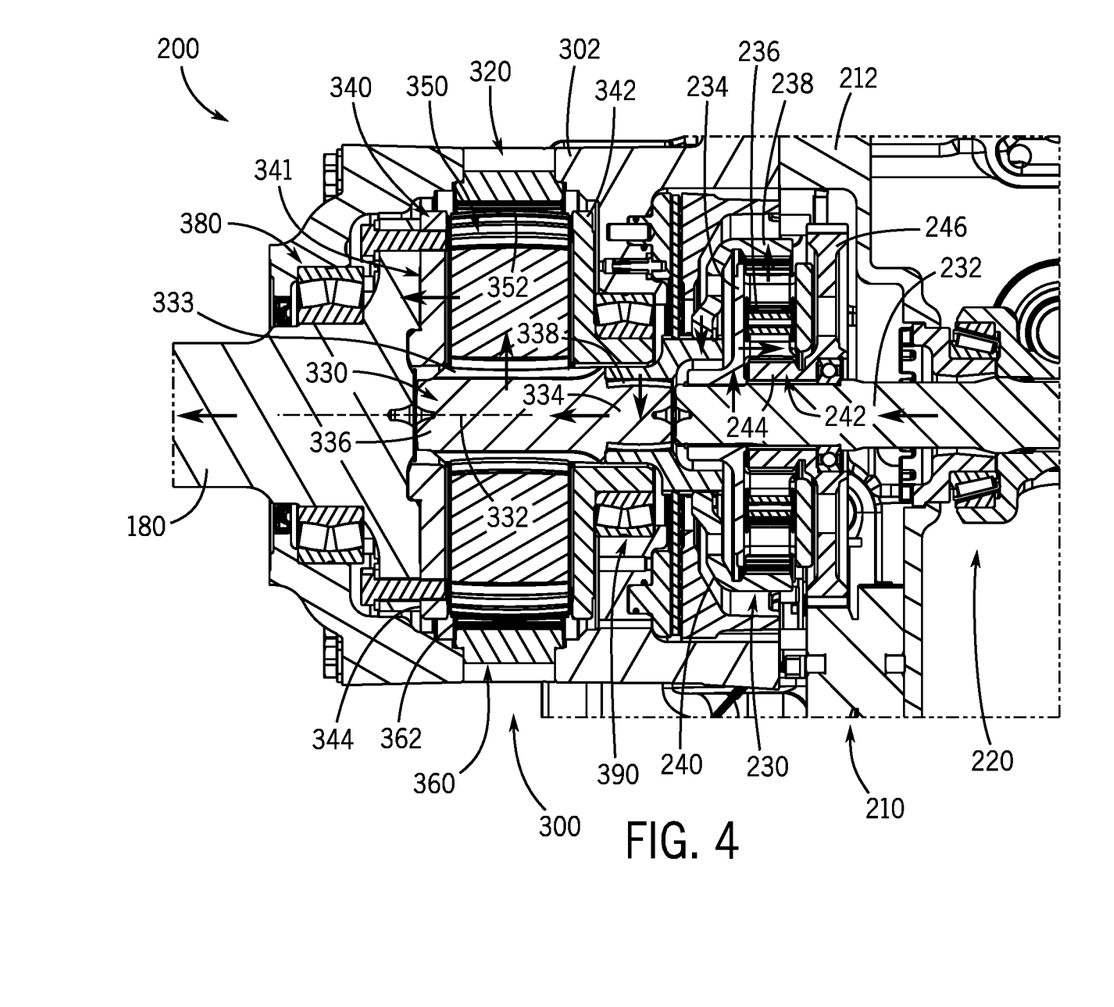
FIG. 4 is a partial cross-sectional view of a final drive assembly of the axle assembly of FIG. 3 according to an embodiment.

Reference is now made to FIG. 4, which a cross-sectional view of one of the final drive assemblies 300 and other portions of the axle arrangement 200 of FIG. 3. In the description below, the axle shaft 180 and final drive assembly 300 on the left side are discussed; however, the axle shaft 180 and final drive assembly 300 on the right side are substantially similar. Briefly, the axle center section 210, introduced above, includes a number of components that form a power transfer apparatus 220 housed within the center section housing 212 for transferring power to the final drive assemblies 300. The power transfer apparatus 220 may include any number of components that perform a variety of functions associated with track systems 110 (FIG. 1), including steering assemblies, gear assemblies, brake assemblies, suspension assemblies, and the like.

As partially shown in FIG. 4, the power transfer apparatus 220 may include a differential (or first) planetary gear set or arrangement 230. The differential planetary gear arrangement 230 may include a first differential sun gear 232 that functions as an input sun shaft for the differential planetary gear arrangement 230. In particular, the first differential sun gear 232 has a first end that receives input power and a second end with radially external splines that mate with corresponding splines of a differential planet carrier 234. The differential planet carrier 234 supports, via planet shafts, a number of planet gears 236 that circumscribe the first differential sun gear 232. The planet gears 236 have teeth that engage corresponding radially internal teeth of a differential ring gear 238 that circumscribes the planet gears 236. The differential ring gear 238 is engaged with or otherwise fixed to an output hub 240 for the differential planetary gear arrangement 230. The differential planetary gear arrangement 230 further includes a second differential sun gear 242 that is positioned radially in between the first differential sun gear 232 and the planet gears 236. The second differential sun gear 242 circumscribes and is supported by bearings along the first differential sun gear 232 to enable rotation of the first differential sun gear 232 relative to the second differential sun gear 242. The second differential sun gear 242 has a first portion 244 with radially external splines that engage the teeth of the planet gears 236 and a second portion 246 formed by a radially extending flange. The perimeter of the radially extending flange 246 engages radial internal splines within the center section housing 212, thereby fixing the second differential sun gear 242 to the stationary center section housing 212.

As described below, the output hub 240 of the planetary gear arrangement 230 engages elements of the final drive assembly 300 for the transfer of power as rotational input. From the perspective of the final drive assembly 300, the output hub 240 is a final drive input member and will be referenced below as such. It should be noted that the power transfer apparatus 220, particularly the planetary gear arrangement 230, described above is just one arrangement for performing this function and alternative arrangement may be provided.

The final drive assembly 300 includes a final drive housing 302 that mounted to the center section housing 212 in any suitable manner, such as with bolts or fasteners. In some embodiments, the final drive housing 302 may be integral with the center section housing 212. The final drive housing 302 is generally annular and has an inboard side that is configured to receive the input member 240, as described above, and an outboard side from which the axle shaft 180 (partially shown) extends.

As shown, the axle shaft 180 is supported within the housing 302 by a first set of bearings 380. The bearings 380 support the axle shaft 180 to enable rotation relative to the housing 302. Additional details regarding the axle shaft 180 and the first set of bearings 380 are provided below.

The final drive assembly 300 includes a final drive planetary gear set 320 within the housing 302 to transfer power between the input member 240 and the axle shaft 180. The final drive planetary gear set 320 is formed by a sun gear 330, a planet carrier 340, a set of planet gears 350, and a ring gear 360.

The sun gear 330 is formed by a sun shaft 332 having a first end 334 and a second end 336. The first end 334 includes radially external splines 338 that engage corresponding radially internal splines of the input member 240. [Note: In drawings, address clearance between the sun gear and distal end of the input member to allow pivoting]. As discussed in greater detail below, the splines 338 of the sun gear 330 are configured to enable the sun gear 330 to at least partially pivot relative to the input member 240, thereby accommodating potential deflections. Unless otherwise addressed, these deflections may cause misalignment and associated problems within the planetary gear set 320 and other portions of the axle arrangement 200.

The planet carrier 340 circumscribes the shaft 332 of the sun gear 330 and includes a carrier housing 341 at least partially formed by first and second radially extending, axially facing inboard and outboard plates 342, 344. The inboard plate 342 of the planet carrier 340 is supported for rotation relative to the housing 302 by a second set of bearings 390, and the outboard plate 344 is fixed (e.g., bolted) to the axle shaft 180. The plates 342, 344 of the planet carrier 340 support the series of planet gears 350 on planet shafts (not shown) in between the plates 342, 344. As a result, the planet gears 350 are configured for individual rotation about the axes of the planet shafts (not shown) within the planet carrier 340; and as a set, the planet gears 350 rotate with the planet carrier 340 about the axis of the sun shaft 332.

Each of the planet gears 350 includes teeth 352 that engage radially external splines 333 along the axial sun shaft 332 such that the sun gear 330 may drive rotation of the planet gears 350, as described in greater detail below.

The ring gear 360 circumscribes the planet gears 350 and includes radially internal teeth 362 that mesh or otherwise engage the teeth 352 of the planet gears 350. In this embodiment, the ring gear 360 is fixed to the stationary final drive housing 302. In particular, the ring gear 360 may be considered to form part of the final drive housing 302.

As a result of this arrangement, and as indicated by arrows representing the power flow, the input member 240 from the axle center section 210 drives the sun gear 330 of the final drive assembly 300. Rotation of the sun gear 330 drives the planet gears 350 about the planet shafts (not shown). Since the ring gear 360 is fixed, rotation of the individual planet gears 350 also drives rotation of the set of planet gears 350, and thus, the planet carrier 340.

In this arrangement, the carrier housing 341 of the planet carrier 340, specifically the outboard plate 344, is fixed to an inboard axial face 182 of the axle shaft 180. In other words, the planet carrier 340 is directly fastened to the axle shaft 180. In this manner, the planet carrier 340 functions as an output member for the planetary gear set 320 to drive the axle shaft 180.

Figure 5:
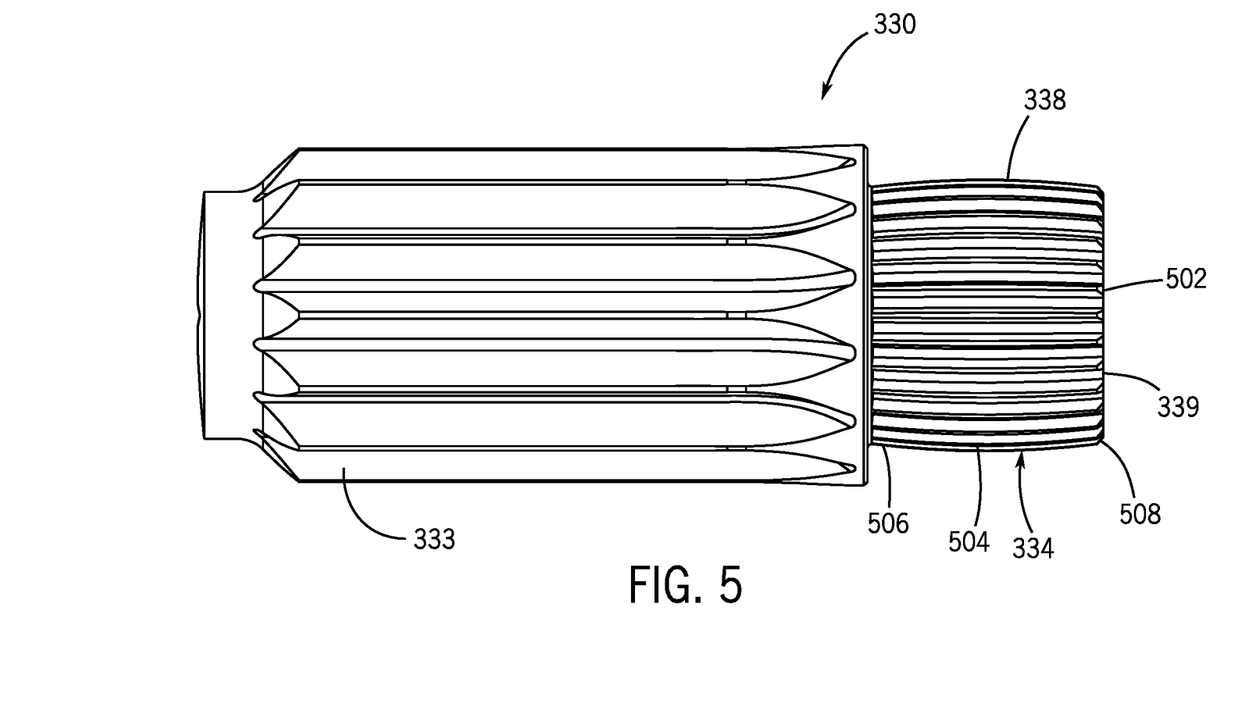
FIG. 5 is a closer view of a portion of a sun gear of the final drive assembly of FIG. 4 according to an embodiment.

As introduced above, the final drive assembly 300 includes one or more features that accommodate deflections resulting from loads on the axle shaft 180. In one embodiment, the planetary gear set 320 includes a pivoting sun gear 330 at the engagement between the sun gear 330 and the input member 240. FIG. 5 is a closer view of a portion of the sun gear 330 removed from the final drive assembly 300 of FIG. 4 according to an embodiment. As shown, the splines 338 of the sun gear 330 are crowned or rounded relative to the base surface 502 of sun gear 330 with a profile that is at least partially spherical, e.g., "spherically crowned." Specifically, each spline 338 has a raised center 504 that tapers along the axial dimension to the ends 506, 508 on the base surface 502. The taper of the spline 338 may have a radius of curvature to result in the crowned or rounded configuration of the spline 338. As a result of the crowned splines 338, the sun gear 330 may at least partially pivot at the first end 334 as a result of radial deflections or movement of the sun gear 330 at the second end 336 or along the shaft 332 of the sun gear 330. Additionally, the face 339 of the first end 334 may also be configured to accommodate a pivoting movement. In particular, the face 339 may be spherical or have chamfered edges to provide suitable spacing such that the edges of the face 339 do not contact the interior surface of the input member 240 during a pivoting movement. As a result of this arrangement, any deflections of the sun gear 330 may result in pivoting of the sun gear 330 rather than transferring the deflection to the input member 240 and the inboard portions of the axle arrangement 200. In other words, the pivoting sun gear 330 may accommodate and isolate deflections within the final drive assembly 300.

Figure 6:
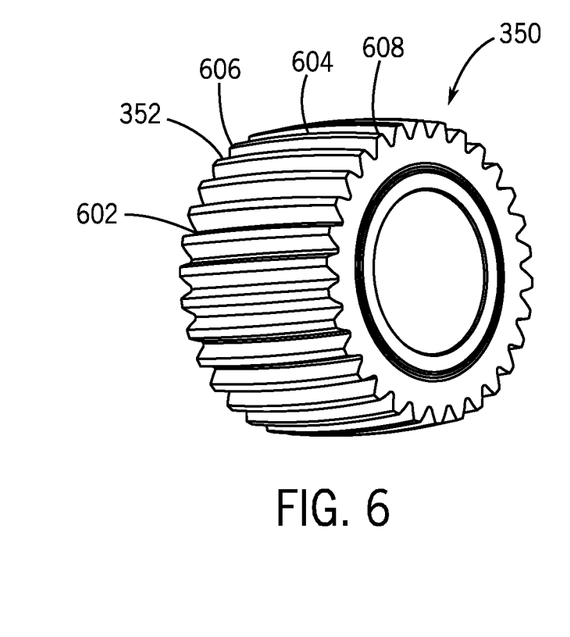
FIG. 6 is a closer view of a portion of a planet gear of the final drive assembly of FIG. 4 according to an embodiment.

Additional features that accommodate deflections resulting from loads on the axle shaft 180 may be incorporated into the planet gears 350. As a further example, reference is made to FIG. 6, which is a closer view of one of the planet gears 350 removed from the final drive assembly 300 of FIG. 4. As shown, the teeth 352 of the planet gear 350 may be spherically crowned or rounded in the axial dimension relative to the base surface 602 of planet gear 350. Specifically, each tooth 352 has a raised center 604 that tapers along the axial dimension to the ends 606, 608 to the base surface 602 of the planet gear 350. The taper of each tooth 352 may have a radius of curvature to result in the crowned or rounded configuration. As a result of the crowned teeth 352, the planet gears 350 may at least partially pivot or "rock" about an axial center relative to the ring gear 360 between the engagement of the planet gears 350 and the ring gear 360 and relative to sun gear 330 between the engagement of the planet gears 350 and the ring gear 360. As a result of this arrangement, any deflections of the planet carrier 340, resulting in deflections of the planet gears 350, may result in pivoting of the planet gears 350 rather than transferring the force of the deflection to the ring gear 360 or the sun gear 330. In other words, the pivoting sun gear 330 may accommodate and isolate deflections within the final drive assembly 300 prior to transference to other portions of the final drive assembly 300.

As a further example, and referring again to FIG. 4, the sets of bearings 380, 390 may also be configured to accommodate relative deflections within the final drive assembly 300. As noted above, the first set of bearings 380 support the end of the axle shaft 180 within the housing 302, and the second set of bearings 390 support the planet carrier 340 within the housing 302. One or both sets of bearings 380, 390 may be crowned along the axis of rotation to further accommodate deflections within the final drive assembly 300. In particular, the bearings 380, 390 have raised or rounded axial centers in a generally cylindrical configuration that enable the bearings 380, 390 to deflect or "rock" on the respective race surfaces to accommodate at least a small amount of misalignment or deflection between the associated components.

In the particular depicted example, the first set of bearings 380 enable some amount of deflection of the axle shaft 180 relative to the housing 302 of the final drive assembly 300. Similarly, the second set of bearings 390 enable some amount of deflection of the planet carrier 340 relative to the housing 302. As such, the bearings 380, 390 contribute to the isolation of deflections within the final drive assembly 300 resulting from bending forces imparted by the axle shaft 180.

Figure 7:
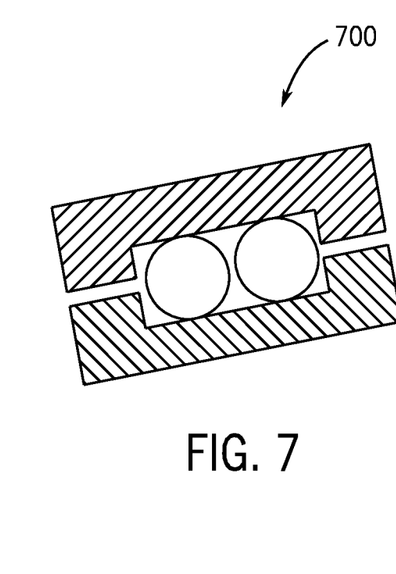
FIG. 7 is a closer view of a set of support bearings that may be incorporated into the final drive assembly of FIG. 4 according to a further embodiment.

The bearings 380, 390 in FIG. 4 may be considered crowned. However, other bearing configurations may be provided. Reference is briefly made to FIG. 7, which depicts a set of spherical rolling bearings 700 that may be utilized in a similar manner to the bearings 380, 390 of FIG. 4. In particular, the final drive assembly 300 may utilized the spherical rolling bearings 700 of FIG. 7 as bearings between the axle shaft 180 and the housing 302 and/or as bearings between the planet carrier 340 and the housing 302.

Accordingly, the final drive assembly discussed above accommodates deflections and bending loads within the final drive assembly itself, primarily within the planetary gear set. In other words, the accommodation is accomplished without additional mechanisms outside of the planetary gear set for performing similar functions that would otherwise add to the axial length of the final drive assembly (i.e., such as elastic spline arrangements between the axle shaft and the planetary gear set). Instead, the axle shaft may be bolted directly to the planet carrier of the final drive assembly and operate as desired. This arrangement maximizes the extent of adjustment for the track system along the axle shafts. Further additional accommodation mechanisms would add additional cost and complexity to the axle arrangement.

Also, the following examples are provided, which are numbered for easier reference:

1. An axle final drive assembly for a work vehicle comprising: a final drive housing; an output shaft extending from the final drive housing; a planetary gear set contained in the final drive housing and having an element fixed to the output shaft; and an input member contained in the final drive housing providing rotational input to the planetary gear set for driving the output shaft; wherein the planetary gear set, at least in part, is pivotally coupled to the input member.

2. The assembly of example 1, wherein the planetary gear set has a sun gear pivotally coupled to the input member.

3. The assembly of example 2, wherein the sun gear and the input member engage at a mating spline connection in which splines of the sun gear or the input member have a crowned profile in an axial dimension of the output shaft.

4. The assembly of example 3, wherein the crowned profile is partially spherical.

5. The assembly of example 2, wherein the sun gear has spherically crowned splines that mate with splines of the input member.

6. The assembly of example 1, wherein the planetary gear set has a carrier and the carrier is the element to which the output shaft is fixed.

7. The assembly of example 6, wherein the carrier is formed by a carrier housing with inboard and outboard plates, the output shaft being bolted to the outboard plate.

8. The assembly of example 1, wherein the planetary gear set has a ring gear fixed to the final drive housing.

9. The assembly of example 8, wherein the planetary gear set has planet gears with teeth that mate with teeth of the ring gear at a gear mesh having a crowned profile in an axial dimension of the output shaft.

10. The assembly of example 9, wherein the teeth of the planet gears have a spherical crown in the axial dimension of the output shaft.

11. The assembly of example 1, further including one or more bearings supporting the output shaft and the planetary gear set for rotation about a rotation axis; wherein the one or more bearings have a ball or roller that is crowned in the direction of the rotation axis.

12. The assembly of example 11, wherein the one or more bearings are spherical roller bearings.

13. A driveline for a work vehicle, comprising: a first track system comprising a drive wheel and a track driven by the drive wheel; a first axle shaft with a first end and a second end, the first end of the first axle shaft engaging the drive wheel of the first track system; a first final drive assembly comprising: a final drive housing receiving the second end the first axle shaft; and a planetary gear set contained in the final drive housing and having an element fixed to the first axle shaft; and an axle arrangement center section configured to receive rotational input from a drive shaft and comprising an input member to distribute at least a portion of the rotational input to the planetary gear set for driving the first axle shaft, wherein the planetary gear set, at least in part, is pivotally coupled to the input member of the axle arrangement center section.

14. The driveline of example 13, wherein the first track system is repositionable along the first axle shaft in an axial dimension.

15. The driveline of example 13, wherein the planetary gear set has a sun gear pivotally coupled to the input member at a mating spline connection in which splines of the sun gear or the input member have a crowned profile in an axial dimension of the first axle shaft.

16. The driveline of example 15, wherein the crowned profile is partially spherical.

17. The driveline of example 13, wherein the planetary gear set has a carrier formed by a carrier housing with inboard and outboard plates, the first axle shaft being bolted to the outboard plate.

18. The driveline of example 17, wherein the planetary gear set has a ring gear fixed to the final drive housing.

19. The driveline of example 18, wherein the planetary gear set has planet gears with teeth that mate with teeth of the ring gear at a gear mesh having a crowned profile in an axial dimension of the first axle shaft.

20. The driveline of example 13, further including one or more bearings supporting the first axle shaft and the planetary gear set for rotation about a rotation axis, wherein the one or more bearings have a ball or roller that is crowned in the direction of the rotation axis.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An axle final drive assembly for a work vehicle comprising:
 a final drive housing;
 an output shaft extending from the final drive housing;
 a planetary gear set contained in the final drive housing and having an element fixed to the output shaft and having planet gears with teeth that mate with teeth of a ring gear at a gear mesh having a crowned profile in an axial dimension of the output shaft; and
 an input member contained in the final drive housing providing rotational input to the planetary gear set for driving the output shaft;
 wherein the planetary gear set, at least in part, is pivotally coupled to the input member.

2. The assembly of claim 1, wherein the planetary gear set has a sun gear pivotally coupled to the input member.

3. The assembly of claim 2, wherein the sun gear and the input member engage at a mating spline connection in which splines of the sun gear or the input member have a crowned profile in an axial dimension of the output shaft.

4. The assembly of claim 2, wherein the sun gear has crowned splines that mate with splines of the input member.

5. The assembly of claim 1, wherein the planetary gear set has a carrier and the carrier is the element to which the output shaft is fixed.

6. The assembly of claim 5, wherein the carrier is formed by a carrier housing with inboard and outboard plates, the output shaft being bolted to the outboard plate.

7. The assembly of claim 1, wherein the planetary gear set has a ring gear fixed to the final drive housing.

8. The assembly of claim 1, wherein the teeth of the planet gears have a crown in the axial dimension of the output shaft.

9. The assembly of claim 1, further including one or more bearings supporting the output shaft and the planetary gear set for rotation about a rotation axis;
 wherein the one or more bearings have a ball or roller that is crowned in the direction of the rotation axis.

10. The assembly of claim 9, wherein the one or more bearings are spherical roller bearings.

11. A driveline for a work vehicle, comprising:
 a first drive system comprising a drive wheel;
 a first axle shaft with a first end and a second end, the first end of the first axle shaft engaging the drive wheel of the first drive system;
 a first final drive assembly comprising:
 a final drive housing receiving the second end the first axle shaft; and
 a planetary gear set contained in the final drive housing and having an element fixed to the first axle shaft; and
 an axle arrangement center section configured to receive rotational input from a drive shaft and comprising an input member to distribute at least a portion of the rotational input to the planetary gear set for driving the first axle shaft,
 wherein the planetary gear set, at least in part, is pivotally coupled to the input member of the axle arrangement center section.

12. The driveline of claim 11, wherein the first drive system is repositionable along the first axle shaft in an axial dimension.

13. The driveline of claim 11, wherein the planetary gear set has a sun gear pivotally coupled to the input member at a mating spline connection in which splines of the sun gear or the input member have a crowned profile in an axial dimension of the first axle shaft.

14. The driveline of claim 11, wherein the planetary gear set has a carrier formed by a carrier housing with inboard and outboard plates, the first axle shaft being bolted to the outboard plate.

15. The driveline of claim 14, wherein the planetary gear set has a ring gear fixed to the final drive housing.

16. The driveline of claim 15, wherein the planetary gear set has planet gears with teeth that mate with teeth of the ring gear at a gear mesh having a crowned profile in an axial dimension of the first axle shaft.

17. The driveline of claim 11, further including one or more bearings supporting the first axle shaft and the planetary gear set for rotation about a rotation axis, wherein the one or more bearings have a ball or roller that is crowned in the direction of the rotation axis.

* * * * *